US007840908B2

(12) United States Patent
Ernst et al.

(10) Patent No.: US 7,840,908 B2
(45) Date of Patent: Nov. 23, 2010

(54) HIGH RESOLUTION DISPLAY OF LARGE ELECTRONICALLY STORED OR COMMUNICATED IMAGES WITH REAL TIME ROAMING

(75) Inventors: Rudolf O. Ernst, Union Hall, VA (US); Pun Sing Lui, Hong Kong (CN)

(73) Assignee: Pixia Corp., Sterling, VA (US)

( * ) Notice: Subject to any disclaimer, the term of this patent is extended or adjusted under 35 U.S.C. 154(b) by 31 days.

(21) Appl. No.: 10/243,273

(22) Filed: Sep. 13, 2002

(65) Prior Publication Data

US 2003/0063127 A1 Apr. 3, 2003

Related U.S. Application Data

(60) Provisional application No. 60/322,011, filed on Sep. 13, 2001.

(51) Int. Cl.
*G06F 3/048* (2006.01)
*G06F 13/00* (2006.01)
*G09G 5/00* (2006.01)

(52) U.S. Cl. ....................... 715/792; 715/790; 715/764; 715/766; 382/302; 382/305; 345/698; 345/1.2; 345/1.3; 345/538; 345/9

(58) Field of Classification Search ................. 345/716, 345/694, 698, 628, 1.2, 1.3, 643, 660, 686, 345/670, 671, 3, 570, 619, 629; 382/168, 382/299, 246, 302, 305; 715/792, 781, 716, 715/719, 763–767; 282/245
See application file for complete search history.

(56) References Cited

U.S. PATENT DOCUMENTS 4,823,108 A * 4/1989 Pope .......................... 715/806
4,873,513 A 10/1989 Soults et al.
4,878,117 A 10/1989 Ikehira et al.
5,263,136 A 11/1993 DeAguiar et al.
5,341,466 A 8/1994 Perlin et al.
5,414,809 A 5/1995 Hogan et al.
5,513,282 A 4/1996 Williams
5,611,041 A * 3/1997 Bril et al. .................... 345/558
5,706,451 A * 1/1998 Lightbody et al. .......... 345/723
5,710,835 A 1/1998 Bradley
5,831,612 A 11/1998 Stoval, III et al.
5,847,705 A * 12/1998 Pope .......................... 715/790

(Continued)

OTHER PUBLICATIONS

Tom Barclay et al., "Microsoft TerraServer: A Spatial Data Warehouse," Microsoft Ressearch Advanced Technology Division, Jun. 1999.*

(Continued)

*Primary Examiner*—Tadeese Hailu
(74) *Attorney, Agent, or Firm*—Pillsbury Winthrop Shaw Pittman LLP

(57) ABSTRACT

A video display system, which enables users to navigate (by panning and zooming) throughout very large digital images. The digital images are stored on a disk drive in a proprietary file format (which is optimized for speed) and then viewed via a VGA connection. The system enables a user's ability to navigate throughout the entire image seamlessly. Instead of requiring a large amount of memory to display these images, the images are essentially transferred directly from the disk drive to video memory.

14 Claims, 13 Drawing Sheets

U.S. PATENT DOCUMENTS

| | | | | |
|---|---|---|---|---|
| RE36,145 | E | 3/1999 | DeAguiar et al. | |
| 5,889,669 | A * | 3/1999 | Kagami et al. | 700/17 |
| 5,905,506 | A | 5/1999 | Hamburg | |
| 5,933,537 | A | 8/1999 | Hajjahmad et al. | |
| 6,012,109 | A | 1/2000 | Schultz | |
| 6,075,905 | A * | 6/2000 | Herman et al. | 382/284 |
| 6,091,430 | A | 7/2000 | Bodin et al. | |
| 6,130,661 | A | 10/2000 | Ilbery | |
| 6,141,023 | A * | 10/2000 | Meinerth et al. | 345/556 |
| 6,182,127 | B1 | 1/2001 | Cronin et al. | 709/219 |
| 6,192,393 | B1 | 2/2001 | Tarantino et al. | |
| 6,222,562 | B1 | 4/2001 | Leidich | |
| 6,262,741 | B1 | 7/2001 | Davies | 245/425 |
| 6,278,432 | B1 | 8/2001 | Ratnakar | |
| 6,323,854 | B1 | 11/2001 | Knox et al. | |
| 6,377,306 | B1 | 4/2002 | Johnson et al. | |
| 6,400,763 | B1 | 6/2002 | Wee | 375/240.16 |
| 6,493,858 | B2 | 12/2002 | Solomon | |
| 6,674,881 | B2 * | 1/2004 | Bacus et al. | 382/128 |
| 6,711,283 | B1 | 3/2004 | Soenksen | 382/133 |
| 6,714,205 | B1 | 3/2004 | Miyashita et al. | 345/536 |
| 6,721,952 | B1 * | 4/2004 | Guedalia et al. | 725/38 |
| 6,904,176 | B1 | 6/2005 | Chui et al. | 382/240 |
| 6,912,253 | B1 | 6/2005 | Li et al. | 375/240.12 |
| 6,912,695 | B2 | 6/2005 | Ernst et al. | 715/792 |
| 7,080,131 | B2 | 7/2006 | Palevich et al. | 709/217 |
| 7,119,811 | B2 | 10/2006 | Ernst et al. | 345/545 |
| 2002/0004860 | A1 * | 1/2002 | Roman | 710/22 |
| 2002/0093516 | A1 | 7/2002 | Brunner et al. | |
| 2002/0159632 | A1 * | 10/2002 | Chui et al. | 382/168 |
| 2002/0194302 | A1 | 12/2002 | Blumberg | |
| 2002/0196467 | A1 | 12/2002 | Delhoune et al. | |
| 2003/0031258 | A1 | 2/2003 | Wang et al. | |
| 2003/0034936 | A1 | 2/2003 | Ernst et al. | 345/55 |
| 2003/0063127 | A1 | 4/2003 | Ernst et al. | |
| 2003/0067420 | A1 | 4/2003 | Ernst et al. | 345/1.3 |
| 2006/0210196 | A1 | 9/2006 | Wensley et al. | 382/305 |
| 2007/0124793 | A1 | 5/2007 | Wang et al. | 725/134 |

OTHER PUBLICATIONS

JieBing Yu and David J. Dewitt, "Processing Satellite Images on Tertiary Storage: A Study of the Impact of Tile Size on Performance,"1996.*

Kamal Bhatia, "Design and Performance Analysis of a Distributed Image Space Navigator," Aug. 1997.*

Rudolf O. Ernst, U.S. Appl. No. 10/263,930, filed Oct. 3, 2002.

Rudolf O. Ernst, U.S. Appl. No. 10/243,794, filed Sep. 14, 2002.

Supplementary. European Search Report issued in PCT/US0229210, Jun. 27, 2008, 5 pages.

Barclay et al., Microsoft TerraServer: A Spatial Data. Warehouse, The Institution of Electrical Engineers Stevenage, Jun. 2000 & 2000 ACM Sigmod. International Conference on Management of Data, May 16-18, 2000, Dallas TX, vol. 29, No. 2, Jun. 1, 2000.

Bhatia et al., "Design and Performance Analysis of A Distributed Image Space Navigator", Internet citation Aug. 1, 1997, Washington University Sever Institute of Technology Department of Computer Science, Aug. 1997.

Yu et al., "Processing Satellite Images on Tertiary Storage: A Study of the Impact of the Tile Size on Performance", NASA Conference on Mass Storage Systems, Sep. 1, 1996.

Australian Office Action for Australian Patent Application No. 2007242940, mailed on Oct. 5, 2009.

Canadian Office Action issued regarding Canadian Patent Application No. 2,406,675, mailed Jul. 30, 2010.

Canadian Office Action issued regarding Canadian Patent Application No. 2,463,671, mailed Jul. 8, 2010.

Chinese Office Action for Chinese Patent Application No. 038244276, mailed on Oct. 26, 2007.

Chinese Office Action for Chinese Patent Application No. 038244276, mailed on Aug. 8, 2008.

Chinese Office Action for Chinese Patent Application No. 038244276, mailed on Feb. 6, 2009.

European Office Action for European Patent Application No. 02759681.6, mailed on Sep. 22, 2008.

Supplemental European Search Report for European Patent Application No. 02759681.6, mailed on Jun. 27, 2008.

European Office Action for European Patent Application No. 03799307.8, mailed on Jan. 23, 2009.

Supplemental European Search Report for European Patent Application No. 03799307.8, mailed on Jun. 27, 2008.

Israeli Office Action for Israeli Patent Application No. 167711, mailed on Jan. 25, 2009.

Israeli Office Action for Israeli Patent Application No. 167711, mailed on Oct. 11, 2009.

Israeli Office Action for Israeli Patent Application No. 167711, mailed on Jun. 24, 2010.

Japanese Office Action for Japanese Patent Application No. 2004-541816, mailed on Feb. 2, 2010.

International Preliminary Examination Report for PCT International Patent Application No. PCT/US02/29210, mailed on May 24, 2004.

International Search Report for PCT International Patent Application No. PCT/US02/29210, mailed on Dec. 17, 2002.

International Preliminary Examination Report for PCT International Patent Application No. PCT/US03/30639, mailed on Dec. 3, 2004.

International Search Report for PCT International Patent Application No. PCT/US03/30639, mailed on Apr. 21, 2004.

Philippines Office Action for Philippines Patent Application No. 1-2005-500632, mailed on Feb. 19, 2009.

* cited by examiner

HIGH RESOLUTION DISPLAY OF LARGE ELECTRONICALLY STORED OR COMMUNICATED IMAGES WITH REAL TIME ROAMING

FIELD AND BACKGROUND OF THE INVENTION

The present application relates to displays of images from digital image files on various devices including but not limited to CRT, LCD, TFT, electro-luminescent, plasma, DLP, and more particularly to zooming in and out (zooming, panning) and multi-dimensional roaming of the displayed images at various levels of zoomed sizing. The images can be geographic (terrestial and astronomy), chemical and biological compound and organism structures, anatomical structures of plants and animals, graphical representations of complex data and combinations (e.g. data on demographic and resource distribution over a geographical area)—all of massive size but requiring fast zoom in while retaining a high degree of resolution.

There is a focus for purposes of this invention on images/image files larger than two gigabytes in uncompressed twenty-four bit RGB color space, but other images/image files can be handled beneficially through the present invention. High-resolution digital imagery has only been available to the general public for the last two years, but much longer in military and industrial settings. Systems available for general usage to view very large images in real time are very expensive and contain unnecessary technology for the task at hand. Current systems capable of loading/reading an image over two gigabytes in size will pass the image contained on the disk drive through a 3D graphics engine before displaying it. Due to the current speed limitations of these 3D graphics engines, the quality of the image displayed on the screen ultimately suffers. Current systems read the image from the hard drive as a bmp, rgb, or tif file.

The present invention has as its objects:

- provision of an enabling technology for viewing digital images, including A/D converted images as well as digital originals;
- viewing very large images with high resolution;
- inherent scalability to server, desktop, portable forms;
- portability for various hardware, software, and telecommunication channel sources of the data to be displayed with optional use of dedicated software or standard operating systems, such as Microsoft Windows NT, Unix (of various types) or Linux; and
- reduction of disk (or other source) access times;

SUMMARY OF THE INVENTION

The following summary description and later Detailed Description of Preferred Embodiments incorporates, by references, appendices I-V appended hereto.

The foregoing objects are achieved in a new method and apparatus that provides streaming data and uses on-screen and off-screen VRAMs or the like, outputting video signals to a CRT, or the like, or corresponding signals to other displays. The various storage, control and communication components can be preferably on PMC boards communicating via a PMC or mini-PCI bus for example. Images are stored in 'tiled' format described below and streamed in video output form, or some digital data stream, to a video display device, or some device capable of processing the digital data stream. The images are tiled to deal effectively with large ratio panning and zooming while preserving high resolution.

Preferably, operating system usage is omitted to maximize bandwidth availability and save boot time. Because image data needs to travel from a SCSI PMC board to a video PMC board via the bus, it is essential that the bandwidth of the bus be maximized at all times. This is enabled if there is no operating system running; an operating system tends to cause an unpredictable amount of traffic on the PCI bus or other bus. Omission of an operating system and its loading can reduce boot time to approximately 3 seconds.

The preferred system, which is essentially stand-alone and outputs video, can be easy to integrate into most environments. Most VGA monitors accept progressive signals between 604×480 and 1280×1024 at 60 to 85 Hz. The system of the invention can run, e.g., at 640×480 at 75 Hz and can therefore be used in conjunction with a supercomputer or a regular office or home type computer. The system is capable of streaming image data from a disk drive to an off-screen VRAM as a user roams through the onscreen VRAM. When the system issues a read command to the SCSI controller, the command is issued as non-blocking and therefore returns control back to the user while the image is being read from the disk in the background. This requires extensive low-level control of the registers on the SCSI controller.

The performance of the system of the invention does not degrade as image size increases. Most prior systems degrade drastically as the image size increases because they need to seek through most of the image to actually read the lines they require. Images are stored on the disk drive in a tiled and overlapping format to overcome this limitation. Essentially the image is split into (preferably vertical) tiles with 50% orthogonal (horizontal) overlap. Each given display output is entirely within a single tile. When one reads the image from the disk it is therefore only necessary to perform one seek followed by a read command. The amount of overlap of neighboring tiles can be adjusted so huge tiles only have minimal overlap (or 640 pixels for a 640×480 display).

Speed is further enhanced through various means as follows:

- Predictive means are provided to preload tiles into the off screen VRAM buffer. Prediction can be based on simple velocity or more complex criteria.
- Adequate VRAM size (e.g. 32 megabytes) allows preloading of multiple predictive zones and then choosing one on the fly.
- When streaming image data through a 3D graphics engine the bandwidth of the image stream is usually reduced drastically. To bypass this limitation, the present invention essentially takes the pixels from the disk drive and passes them into the VRAM without any manipulations. It is due to the fact that no manipulations are being made to the data that the data can be burst into the VRAM without any bandwidth limitations.
- Also, the disk drive is low-level formatted to be half of the tile width, e.g. the tile width is set to 1280 and disk block size is set to 640. Whenever one needs to read a 1280×800 tile from disk to VRAM it is then necessary to seek to the correct block and then read 4800 (800 lines×2 blocks/line×3 colors) blocks. Preferably, image tiles are block aligned on the disk to optimize disk access.

The invention utilizes a preferred filing system that does not have a two Gigabyte file size limitation. The file limit can be expanded to $2^{40}$ bytes, or approximately 1 terabyte, or greater, to ensure high speed/high resolution performance.

The system is synchronized to display interrupts. Its graphics board is preferably set up so that it generates an interrupt at the beginning of every vertical interrupt of the display output. This allows one to accumulate information and then actually change the display only during a vertical interval.

To recapitulate:

The system of the invention is capable of panning and zooming very large images with no image degradation. It is very important that the panning and zooming be extremely smooth. In order to accomplish this primary objective the invention contains four primary features:

Tiled File Format

Images are stored in a tiled file format, or the like, to reduce disk access time. The most significant delay when reading a file in conventional systems occurs whenever the disk drive needs to seek to a new location. The tiled file format (or the like) of the invention ensures that a single unit (assembly) of image data is all that is ever required at any given point in time. This ensures that the disk drive needs to perform one seek to the beginning of the tile followed by reading the entire tile. If the image were not tiled, the disk drive would have to seek to the beginning of the first horizontal line, read the line, seek to the beginning of the next line, and continue doing this until all required lines are read.

Block Aligned Image Data Retrieval

In order to further reduce the disk access time, a storage device such as a disk drive is formatted so that the tile size is an integer multiple of the block size. In a preferred embodiment of the invention described below, the block size on the disk drive is set to 640 (instead of 512) and the tile size is set to a width of 1280. This ensures that the data is perfectly aligned with the block boundaries on the disk drive. In other words, there are no extra bits read from the hard drive at any time. In most systems, the data would be read from the disk drive in block chunks and then the useless or extra data would be discarded.

Pre-stored Zoom Levels

An important feature of the invention is the ability to zoom in and out of images very quickly. Instead of calculating the various zoom levels on the fly from the massive original file, the zoom levels are calculated offline and stored on the disk drive. The invention includes means for allowing images to be transformed to their file format relatively easily. This approach ensures that the worst-case scenario at any given point in time is that a single tile needs to be read from the disk drive.

No Operating System

In order to guarantee performance it is very important that the system is very deterministic and predictable. The invention omits using an operating system because it introduces an additional layer of complexity, which may have certain undesirable side effects. It is very important, for example, that there is no unnecessary traffic on the PCI bus. It is equally important that the registers of the various system boards could be easily accessed and changed in real time. It is due to the low-level control of the SCSI controller that the system is able to send a tile from the disk drive to the video board, while the video board is still able to roam.

Other objects, features and advantages of the invention will be apparent from the following detailed description of preferred embodiments thereof, taken in conjunction with the accompanying drawing, in which,

BRIEF DESCRIPTION OF THE DRAWING

FIG. 5 including component

DETAILED DESCRIPTION OF PREFERRED EMBODIMENTS

The system is implemented in preferred embodiments in hardware and software specific solutions or combinations. It is possible to execute the algorithms of software embodiments on hardware embodiments of the present invention or on other hardware platforms which support Unix or Windows NT systems. For optimal performance, the software should be run on dedicated hardware of the classes outlined in this invention description (not limited to particular models of components and sub-assemblies used in examples presented herein).

Due to the lack of control in current operating systems, such as Windows NT or Unix, of the low level hardware registers, it makes it very difficult to communicate with the controller effectively. Additionally, the operating system will tie up the PCI bus unpredictably. The present invention substantially avoids use of an operating system in the pathway of data traffic. The invention can provide one or more choices of dedicated algorithm to be loaded from FLASH to RAM and then executed. There is absolutely no traffic on a PCI bus unless initiated per the invention for its specific purposes. The invention also enables communication with the SCSI controller so that the SCSI controller can "push" image pixels from disk to VRAM on a SCSI board or the like, without using the processor. An operating system can be used for peripheral or collateral functions or minimally in the data traffic pathway. However, note FIG. 11 below showing another embodiment with greater operating system involvement in a networked context.

Figure 1:
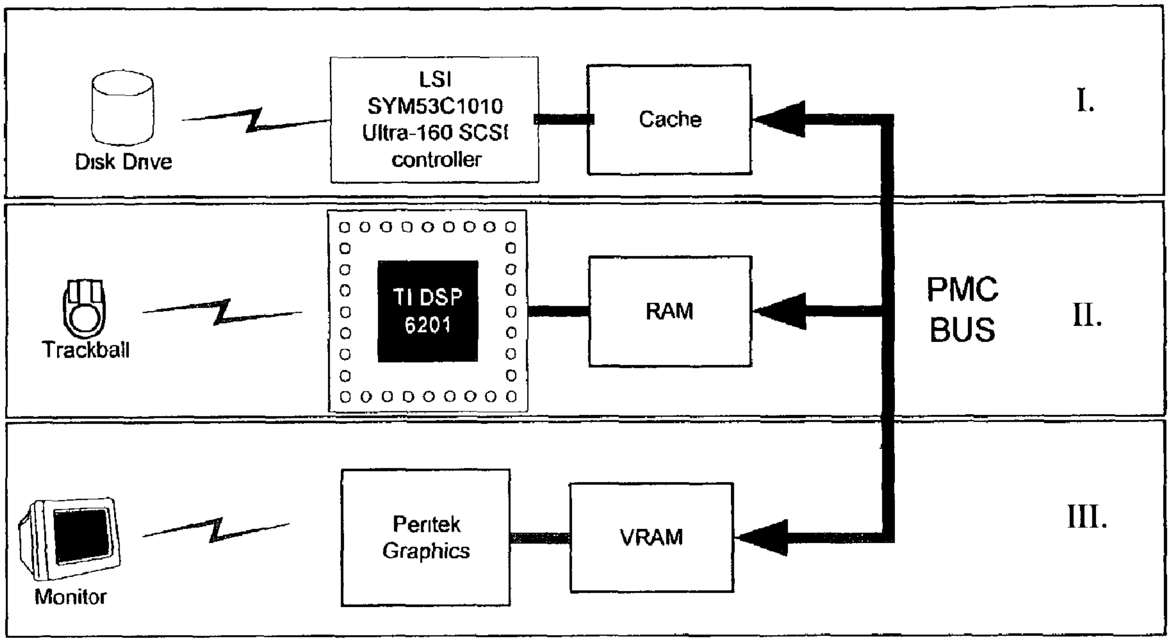
FIG. 1 is a functional hardware diagram of a first preferred embodiment of the invention.

Hardware:

A preferred hardware embodiment utilizes three PMC boards connected together via a PMC (or mini PCI) bus as shown in FIG. 1. The respective boards carry (a) a SCSI Controller and a hard drive; (b) DSP processor and mouse or like interface; and (c) video components including VGA graphics engine and buffer memory, all further detailed as follows:

a. SCSI Controller and Hard Drive

Figure 2:
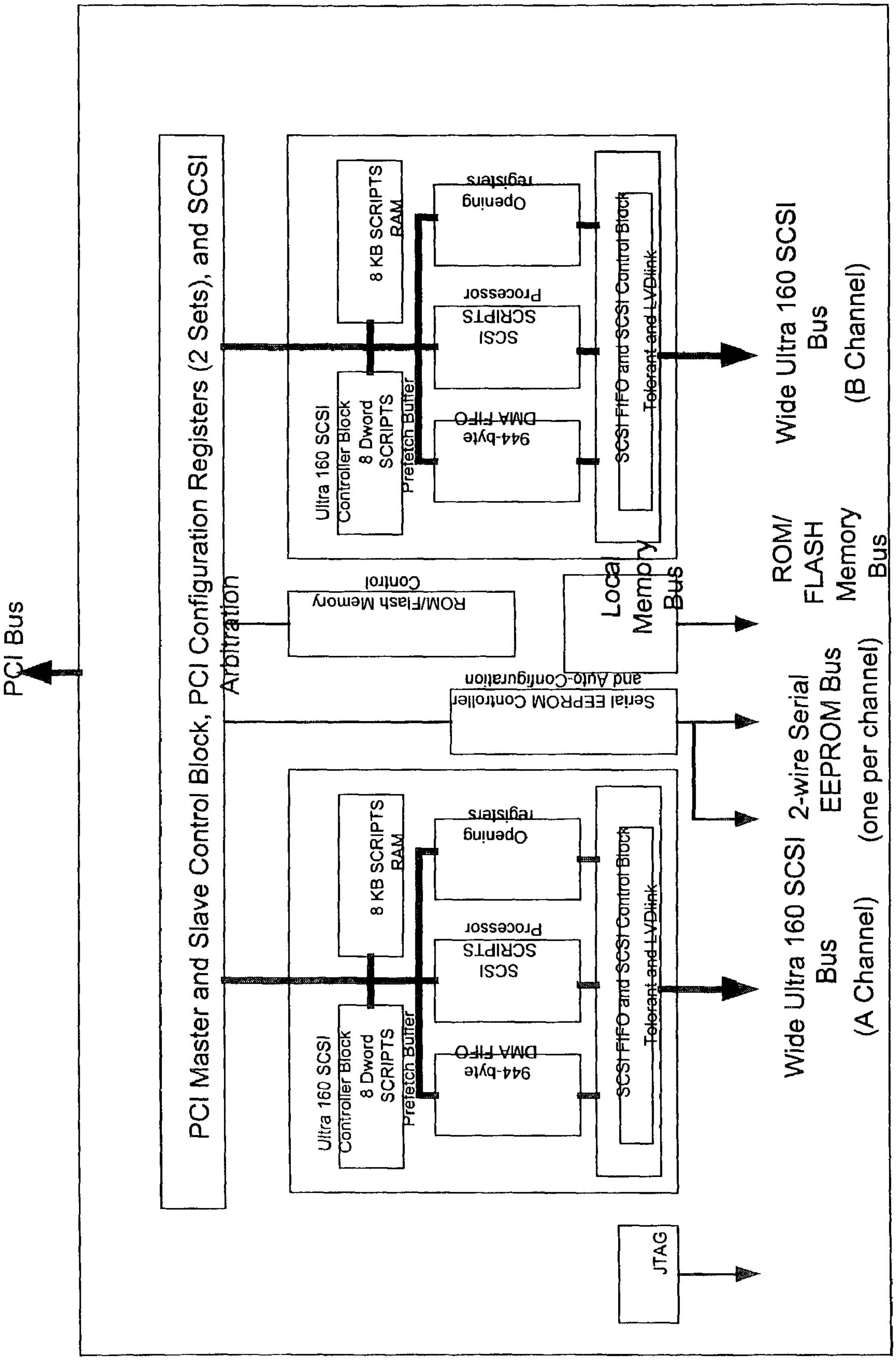
FIG. 2 is a SCSI block diagram per the FIG. 1 embodiment.

A preferred form of SCSI controller board is based on the VMIPMC-5790 manufactured by VMIC. This controller board utilizes LSI Logic's SYM53C1010 dual-channel ultra 160 SCSI controller. The block diagram of the SCSI controller is shown in FIG. 2.

The SYM53C1010 controller has two independent ultra 160 SCSI controllers, support for SCSI, Ultra SCSI, Ultra2

SCSI, and Ultra160 SCSI, 8 KB of internal RAM per channel for SCRIPTS™, support for Nextreme RAID and for up to 32 disk drives (16 devices per controller).

The system has been tested with an 18 GB ST318451LW Seagate drive as well as a 72 GB ST173404LW Seagate drive. The performance numbers are shown in Table 1, within Appendix I at the end of this specification. These speeds indicate how fast data can move from the disk drive to the VRAM. According to the invention, a low-level formatting of the drives is made to 640 bytes per sector, instead of the standard 512 bytes per sector. This ensures that the width of the image to be loaded into the VRAM is block aligned on the disk drive.

b. DSP Processor and Mouse

Figure 3:
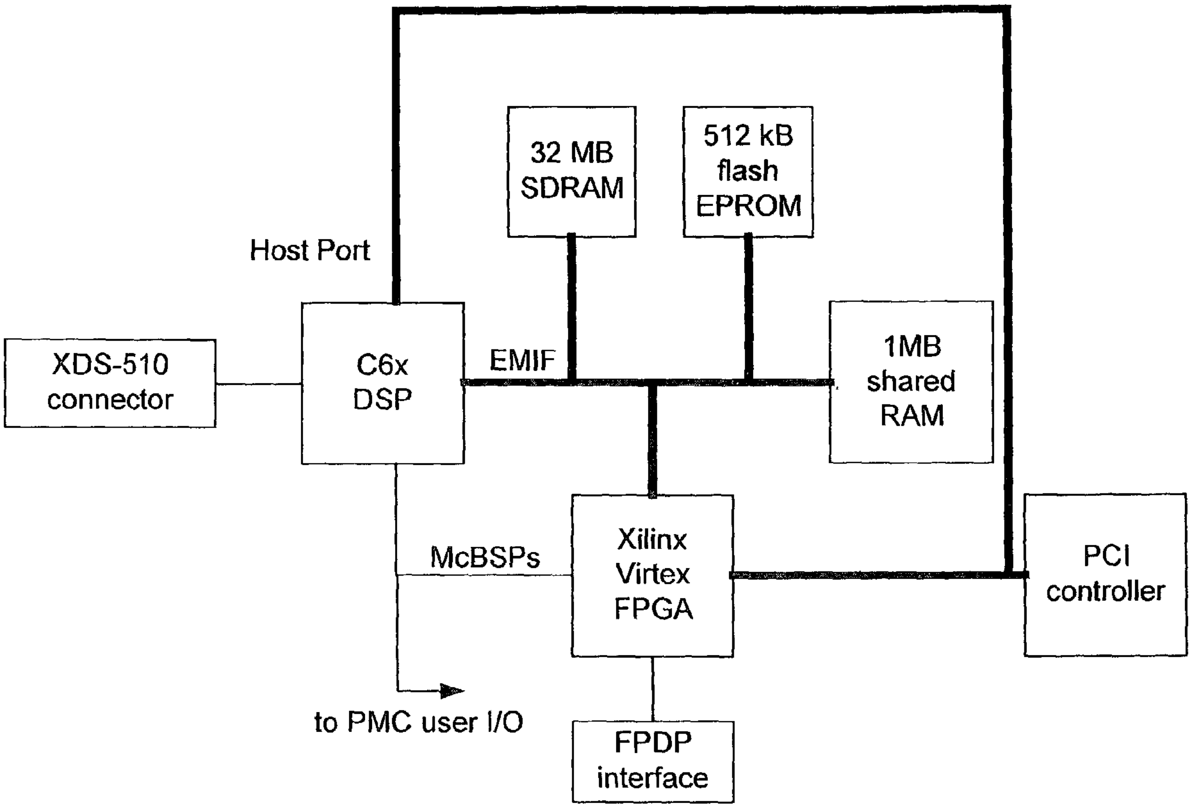
FIG. 3 is a DM11 block diagram per the FIG. 1 embodiment.

A DSP processor preferably used in practice of invention is a Texas Instruments TMS320C6201 digital signal processor chip (6201 DSP), as integrated on a PMC board by Transtech DSP Corp. on its DM11 product. The block diagram of the DSP board is shown in FIG. 3. The board has a 6201 DSP running at 200 megahertz; 32 megabytes SDRAM; Xilinx Virtex FPGA; and FPDP Digital I/O. To make data accessible to the 6201 DSP processor, the data must be read into shared memory. The performance numbers for moving image pixels from disk to shared memory on the DM11 PMC board are shown in Table 2 below. The bandwidth is limited by the bandwidth of the shared memory.

To increase the performance from shared memory to a video board, the Xilinx FPGA on the DM11 was utilized. The performance values are shown in Table 3 below. For user control a mouse or joystick is used via a PS/2 port. To read the PS/2 stream, the McBSP (or Multichannel Buffered Serial Port) is used on the c6201 DSP chip.

c. VGA Graphics Board

Figure 4:
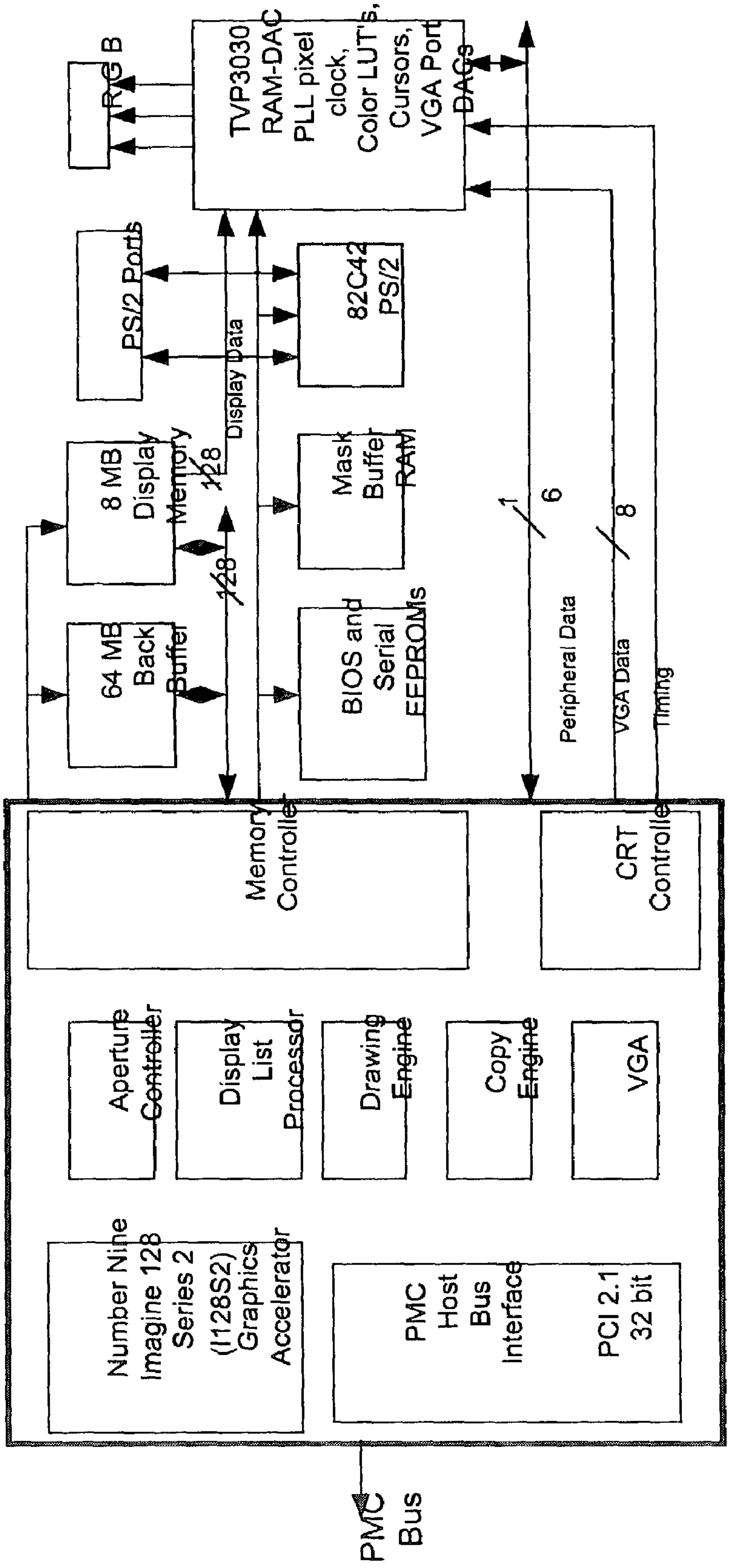
FIG. 4 is a VFX-M block diagram per the FIG. 1 embodiment.
Figure 5A:
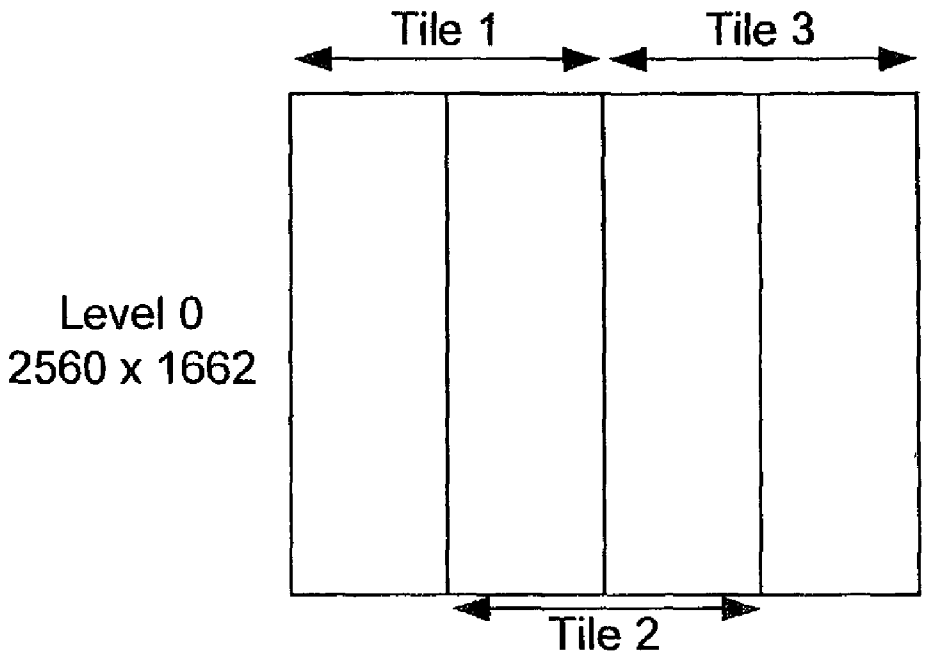
FIGS. 5A-5F shows a typical scene and its tiled structure at various levels of zoom per the FIG. 1 embodiment.
Figure 5B:
Figure 5C:
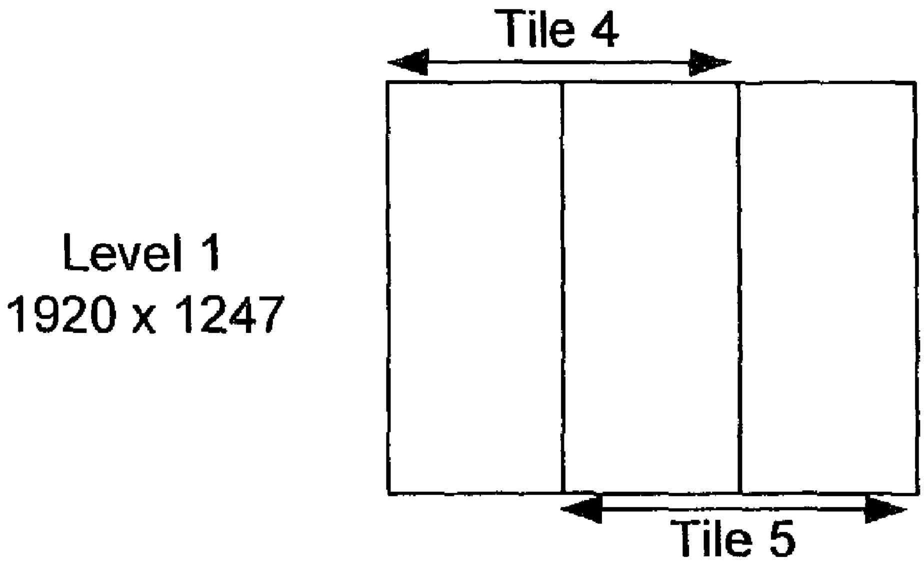
Figure 5D:
Figure 5E:
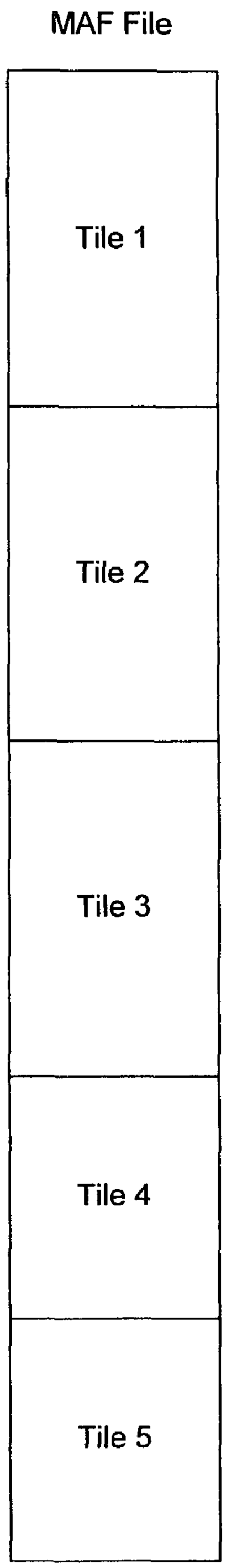
Figure 5F:
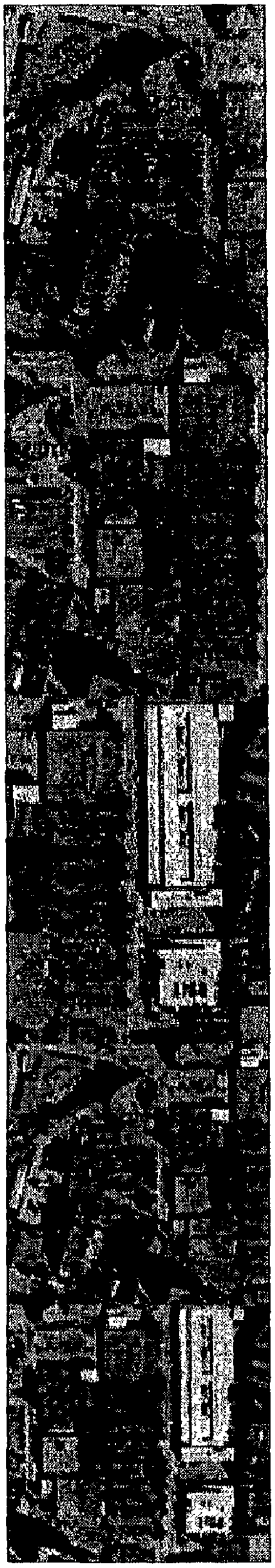

A preferred form of the graphics board uses the Peritek VFX-M/L PMC board. The graphics engine on this board is the Number Nine I128 2D/3D graphics engine. The video board contains two 4 MB SGRAM memory banks. The block diagram of the VFX-M graphics board is shown in FIG. 4. It affords two independently programmable memory windows; support for 8, 16, and 32 bits per pixel; YUV-RGB color space conversion; and high speed image copy.

YUV color space conversion has been tested and works in real time on this graphics board. Since YUV 422 pixels only require 16 bits per pixel (instead of 24 bits), the user can get a performance improvement of over 30 percent. A further embodiment could be made with a capability to image libraries that support YUV. This could work well with the maf file described below for optimization of one of the hardware and software combinations of the invention.

The invention also implements a 2-D zooming algorithm on the video board. Essentially, a frame is copied from the off-screen buffer to the on-screen buffer every vertical interval. Instead of just copying the image, the image is scaled as it is copied. This allows the programmer to program a zoom-in or zoom-out of a specific image in the off-screen buffer. Because the VFX-M board described above only supports 8 MB of VRAM, this approach is not yet feasible for our system. But an enhanced and feasible video board having more VRAM can make this approach feasible.

The video board is also constructed so that the vertical interrupt signal goes directly to one of the IRQ pins on the 6201 DSP via a wire. This enables synchronization (synching) of all system operations with the vertical refresh of the output.

Software:

The software embodiment of the present invention has been optimized to run on our dedicated hardware as described herein. Most of the software tools will, however, run on Windows NT as well as Linux/Unix. The software that has been written can be categorized as low-level software (for accessing the registers of the various chips) and high-level software (for using the low-level functions to build a working system).

Libraries of the software can be compiled so they can be executed on hardware as described above, in a computer with I/O (such as a display for printing messages), in a computer from FLASH (no I/O), on a stand-alone basis (no I/O) and in operating systems including but not limited to Windows NT, Unix, Linux, Windows2000 or Windows CE.

MAF File Format

According to the invention large images are converted to a "maf" file format so that one can read them very efficiently. Besides the header, the maf file contains the original image along with its various scaled zoom levels. FIG. 5 shows how an input image is transformed to a maf file. The key to the format is that it is tiled with each tile overlapping the last by 50 percent. This guarantees that a 640 pixel wide output image is always entirely within a single tile. If one had to load more than one tile to display a single 640×480 pixel image, then the algorithm would not be nearly as efficient.

Adding an Image to the system:

Creating a MAF file from an image

One can read Windows Bitmap files (.bmp) as source images or add more formats (such as .tiff, .jpg, etc.). If the bmp file is less than 2 gigabytes then a maf file can be created directly from that image. See how "maf_create" is used in Appendix II below.

If the bmp file is larger than 2 gigabytes, then the source image must be tiled into tiles that are less than 2 gigabytes each. These tiles can then be converted to a bim file which can be of any size. From this bim file a maf file can be created. Appendix III below describes the process of creating a maf file from a bim file more elaborately.

Creating MOV files from a digital image sequence

An "mov" file is created from a sequence of bmp files or, in principle, from sequences of other formats (such as avi or jpg sequences). When the mov file is played back later, the in and out frame as well as the frame rate can be set. Appendix IV below describes how to make a movie file.

Creating MAFR file from the MAF and MOV files

The MAFR file links the various images on the hard disk together. It is in the MAFR file where different images are related to each other spatially. In order to relate images to one another one coordinate system is chosen. For example, chose the highest resolution image to be set to a scale factor of 1. All of the lower resolution images are scaled according to their scale factor. For example, a 5 megabyte resolution images has a scale factor of 5 if the highest resolution image is 1 meg. To add an image to the existing database the image would be linked to a specific level of an existing image in the database. Once the image has been linked, its exact coordinates within the other image must be specified.

Movie files (MOV) can also be linked to specific levels of an image. It is contemplated that the linking is to be defined to a specific window within a level. This allows for numerous videos for the same level.

Appendix V below describes how to make a MAFR file in more detail.

Playing Back the Images

Figure 6:
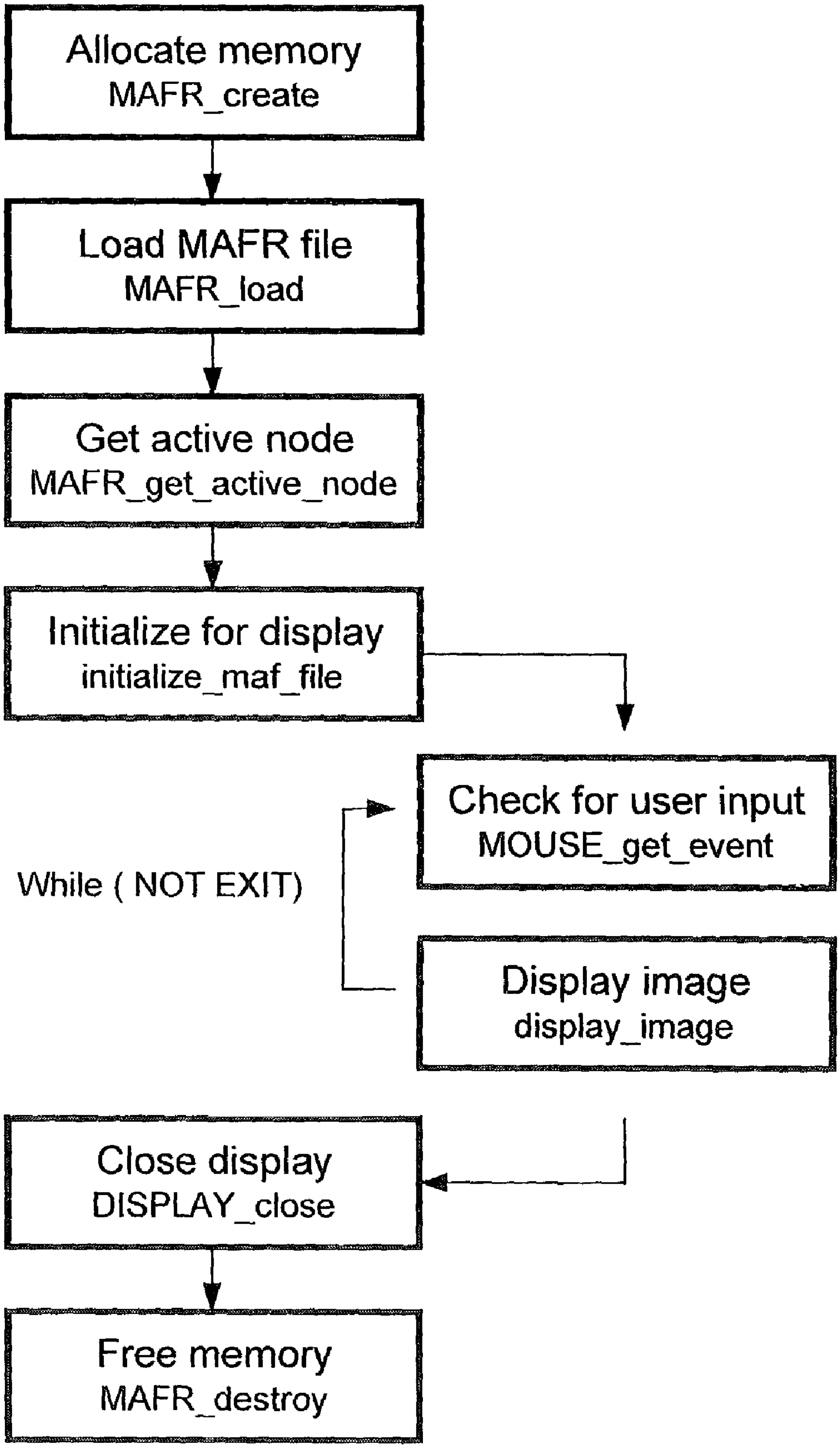
FIG. 6 is a block diagram of functional flow-R of the main display Program.
Figure 7:
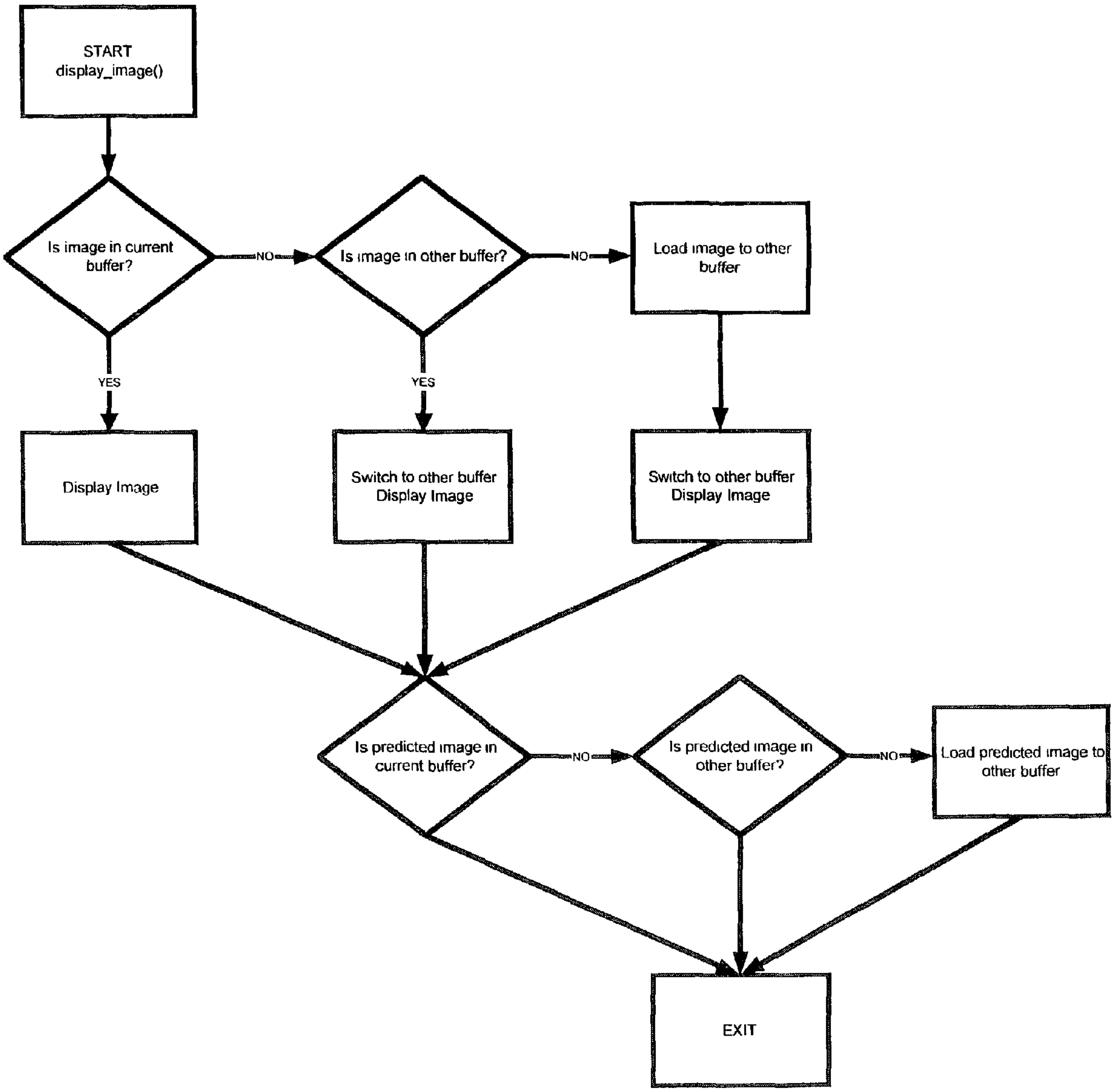
FIG. 7 is a block diagram of display-image functions per the FIG. 1 embodiment.

The invention's system takes the input from the user via trackball or joystick and displays the images accordingly. The program uses some of the function calls as appear in the software libraries to accomplish this. A diagram of the main loop is shown in FIG. 6. The display_image function is responsible for updating the VRAM buffers and displaying the correct window within the VRAM. A brief diagram of this function is shown in FIG. 7.

No Operating system

The invention's system does not use an operating system. There are two immediate benefits from this approach. Because the image data needs to travel from the SCSI PMC board to the video PMC board via the PCI bus, it is essential that the bandwidth of the PCI bus be maximized at all times. This can really only be guaranteed if there is no operating system (such as windows NT or Linux) running. An operating system tends to cause an unpredictable amount of traffic on the PCI bus. The second benefit of not having an operating system is the drastically reduced boot time. Because the system is not loading an operating system, the reboot time is reduced to approximately 3 seconds.

Video interface

A preferred embodiment of the invention is essentially standalone and outputs video. It should therefore be easy to integrate into most environments. Most VGA monitors accept progressive signals between 604×480 and 1280×1024 at 60 to 85 Hz. The system is currently running at 640×480 at 75 Hz and can therefore be used in conjunction with a supercomputer or a regular office computer.

Updating VRAM while user roams

The invention enables the streaming of image data from the disk drive to the offscreen VRAM as the user roams through the onscreen VRAM. When the system issues a read command to the SCSI controller, the command is issued as non-blocking and therefore returns control back to the user while the image is being read from the disk in the background. This requires extensive low-level control of the registers on the SCSI controller.

Tiled file format

An important feature of the invention is that the performance of the system does not degrade as the image size increases. Most systems degrade drastically as the image size increases because they need to seek through most of the image to actually read the lines they require. The invention requires images to be stored on the disk drive in a tiled format, which negates the above mentioned limitations. The image is preferably split into vertical tiles with 50% horizontal overlap. The display output is guaranteed to be entirely within a single tile. When the image is read from the disk it is therefore guaranteed that only 1 seek followed by a read command will ever be required.

Prediction

The invention uses prediction in order to preload tiles into the off screen VRAM buffer. Currently, the prediction is based on simple velocity. A video board which is also contemplated would have 32 megabytes of VRAM (as opposed to the currently described board's 8 megabyte VRAM capacity), and this therefore allows preloading multiple predictive zones and then choosing one on the fly.

Bypassing 3D

When streaming image data through a 3D graphics engine the bandwidth of the image stream is usually reduced drastically. The invention essentially takes the pixels from the disk drive and passes them into the VRAM without any manipulations. It is due to the fact that no manipulations are being made to the data that it can be burst into the VRAM without any bandwidth limitations.

Custom disk block size

The disk drive is low-level formatted to be half of the tile width. In a preferred embodiment of the invention the tile width is set to 1280 and the disk block size is set to 640. Whenever a 1280×800 tile needs to be read from disk to VRAM, the system seeks to the correct block and then reads 4800 (800 lines×2 blocks/line×3 colors) blocks. Because the image tiles are block aligned on the disk, the inventors have optimized disk access as much as possible.

Custom filing system

The invention includes its own filing system. The most significant advantage of having this own filing system is avoidance of the conventional 2 Gigabyte file size limitation. The files are currently limited to $2^{40}$ bytes or approximately 1 terabyte. The use of a custom, simple filing system assures high speed, high resolution performance consistent with high ratio panning and zooming.

Software condition/portability

The software is modular and portable. In order to use the library, third party solution providers need to link in the .lib file and the header file.

Synching the system to the display interrupts

A preferred embodiment is shown with a Pertitek VFX-M graphics board which is set up so that it generates an interrupt at the beginning of every vertical interrupt of the display output. This guarantees that the display is only changed during a vertical interval (which is not visible).

Alternatives

Figure 8:
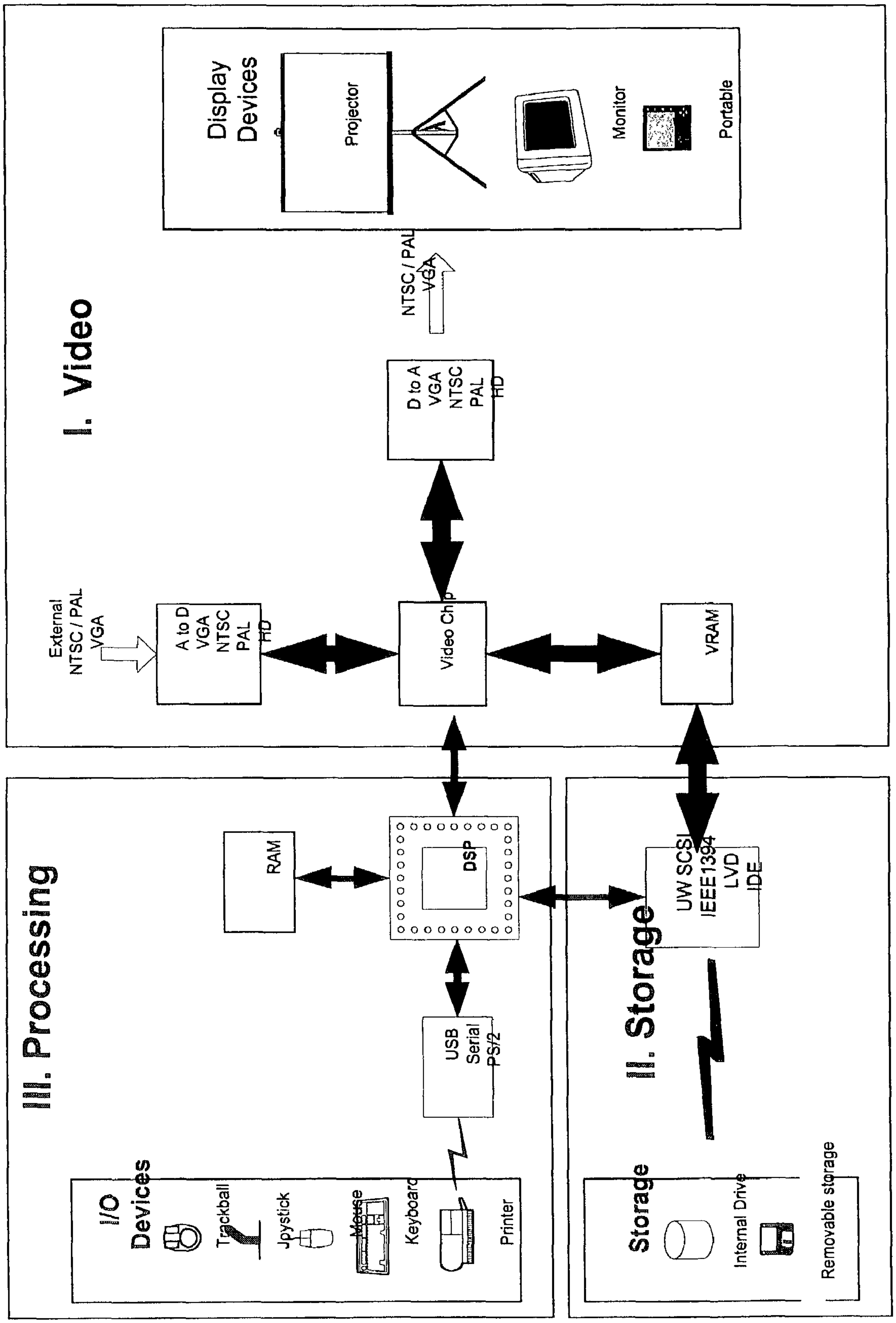
FIG. 8 shows a further preferred embodiment in function hardware diagram form.

The invention also allows for a software toolset as well as a custom hardware solution to display large images as ideally as possible. FIG. 8 illustrates the approach to such a system. The invention also provides a platform for future systems which can be anticipated to be lower cost and more portable.

Video

Figure 9:
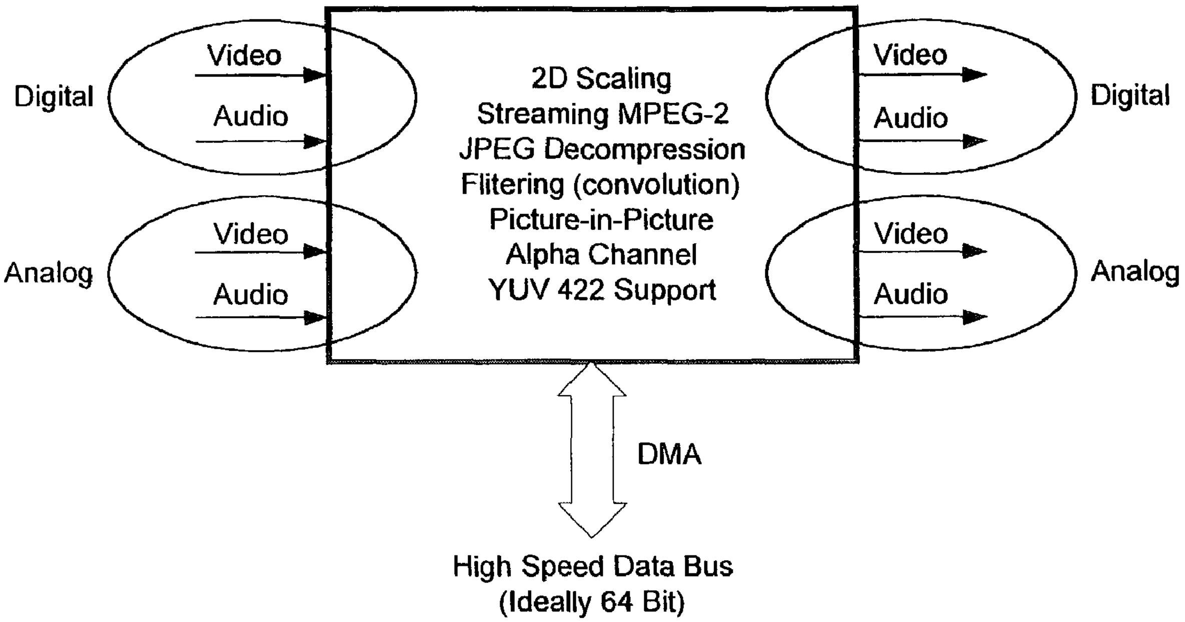
FIG. 9 shows video chip features of a further preferred embodiment.

A preferred video chip for a production scale portable display system is Peritek's latest VGA PMC board named the Eclipse3, or the like. The Eclipse3 is based on Peritek's Borealis3 graphics core. The significant difference between a prior Peritek board and this new one is the VRAM size. The old chip was limited to 8 megabytes of VRAM, while the new chip has 32 megabytes of VRAM. This allows embodiments of the present invention incorporating it to increase tile sizes and thereby increase the output resolution to at least 1024×768. It would also be desirable to build a custom video chip. The essential features of such a chip are shown in FIG. 9. By using simple JPEG decompression or some other image decompression, further embodiments of the invention can compress tiles individually and then decompress them on the fly as they are being sent from the disk to the video ram. Additionally, provision can be made for decoding MPEG streams on the fly. The inputs on the chip allow the system to be in-line with a second device feeding a monitor.

Storage

The preferred embodiment is shown using a SCSI controller, but an IDE controller may suffice for performance. As prediction improves, the data rate from the disk drive can be reduced without affecting the overall performance of the system.

The invention has been tested with YUV (422—16 bit) images. This reduces the storage requirements by over 30 percent and increases performance drastically. The video board is already capable of transforming from YUV to RGB in real time.

Processing

The TMS320C6201 DSP chip is the main processor which is currently being used. The system of the invention can be run on other processors such as a Power PC chip running Linux. The clear advantage of running on a Linux system is the ability to add new features quickly by using standard Linux device drivers for any new devices such as a color printer, or a modem. The disadvantage of running on a Linux system is that the system may be hampered in terms of performance.

Figure 10:
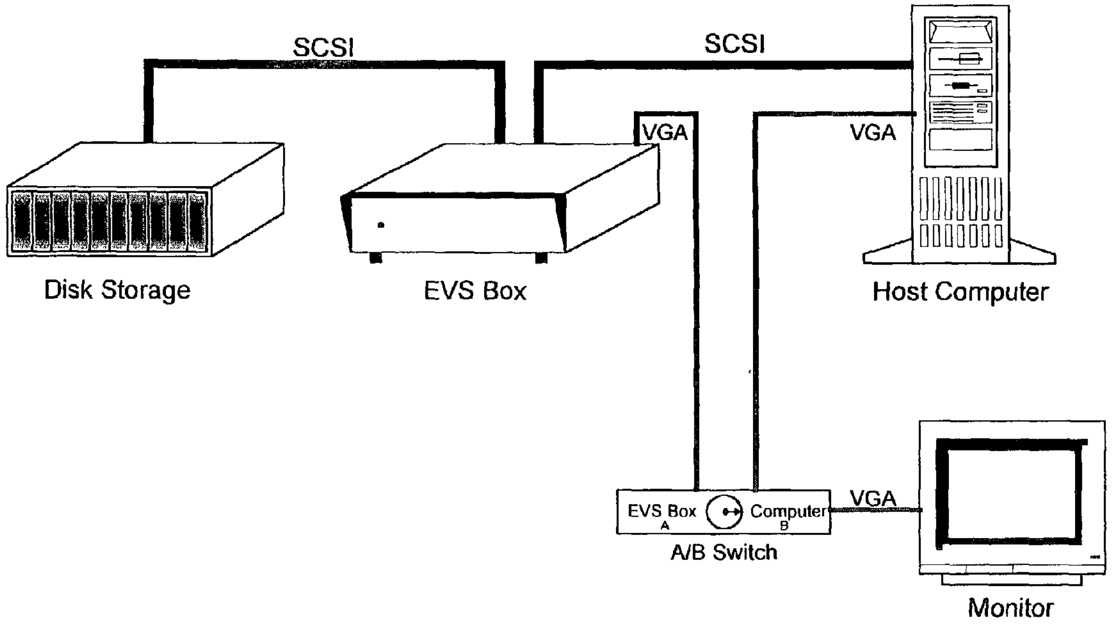
FIG. 10 shows a hardware diagram with an EVS box described below.
Figure 11:
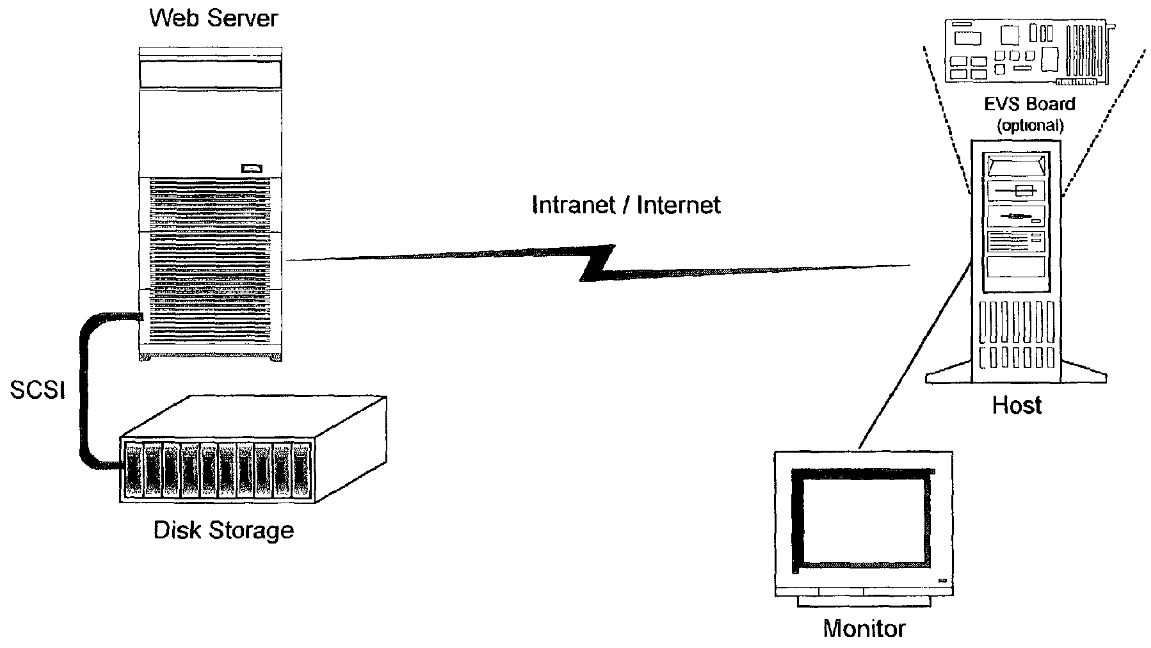
FIG. 11 shows a hardware diagram with EVS used in a networked environment.

FIGS. 10 and 11 illustrate embodiments with an enhanced viewing system (EVS) connected to a host computer or network.

As shown in FIG. 10, the EVS is connected to a host computer via a SCSI. There is a software application running on the host Windows or Unix machine that enables the host to communicate to the EVS via SCSI. One of the primary tasks of the software application is to translate files to and from the inventors proprietary file system on the disk drive(s). This will allow for third party applications to be written on the host, which use the EVS API. Third party software companies could now take advantage of the speed at which the inventors' system could serve "sub-images" from large images stored on disk drive(s) to host memory via SCSI. The system allows for images to be transferred to the EVS box and organized remotely on the host. If the EVS box is disconnected from the host it will function as an independent unit. The A/B switch toggles the monitor between displaying the local host computer or the EVS box. The system could also be used with an independent display device for both the host computer as well as the EVSbox.

As shown in FIG. 11, the imagery is stored on a disk storage system attached to a server. The client workstation is connected to the server via a network (intranet or internet). The server essentially serves up the compressed image tiles via the network based on the client's requests. The application running on the client is very similar to the application running on the EVS box. In order to improve performance a EVS board should be installed on the client. This will allow the decompression to be done in hardware (without affecting the client's overall performance) as well as providing the ability to load the VRAM with a new tile while enabling smooth roaming simultaneously. The bottleneck will be the network connection, which can be compensated for with increased image compression. This system will allow many users to access images from the same server.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A method for viewing images from large data files with high ratio in and out zoom or pan, or both without image degradation and with high speed of image presentation and manipulation, comprising:

formatting, by a processor, an image at a first zoom level to comprise a first set of overlapping image tiles, wherein at least one image tile within the first set of overlapping image tiles overlaps another image tile within the first set of overlapping image tiles, and each image tile within the first set of overlapping image tiles has substantially the same size;

storing in a memory in communication with the processor the first set of overlapping image tiles in blocks, wherein each block is formatted to be a fraction of a tile width size; and selecting, by the processor, a single image tile from the first set of overlapping image tiles for viewing on a display.

2. The method of claim 1, further comprising:

formatting, by the processor, an image at a second zoom level to comprise a second set of overlapping image tiles, wherein each image tile within the second set of overlapping image tiles has the same size; and selecting, by the processor, a single image tile from the second set of overlapping image tiles for viewing on the display.

3. The method of claim 1, wherein each image tile within the first set of overlapping image tiles overlaps an adjacent image tile by 50%.

4. The method of claim 2, wherein each image tile within the second set of overlapping image tiles overlaps an adjacent image tile by 50%.

5. The method of claim 1, wherein each block is formatted to be half of a tile width size.

6. The method according to claim 1, further comprising performing, by the processor, one seek at a beginning of the image tile and reading the whole image tile stored in the memory.

7. The method according to claim 6, further comprising streaming image data to a display without substantial computer operating system intervention.

8. Machine readable media configured to display images from large digital data files with high ratio in and out zoom or pan, or both without image degradation and with high speed of image presentation and manipulation, comprising:

a first module executable by a processor, the first module being configured to format an image at a first zoom level to comprise a first set of overlapping image tiles, wherein at least one image tile within the first set of overlapping image tiles overlaps another image tile within the first set of overlapping image tiles, and each image tile within the first set of overlapping image tiles has substantially the same size;

a second module executable by a processor, the second module being configured to store in a memory in communication with the processor the first set of overlapping image tiles in blocks, wherein each block is formatted to be a fraction of a tile width size; and a third module executable by the processor, the third module being configured to select a single image tile from the first set of overlapping image tiles for viewing on a display.

9. The machine readable media of claim 8, further comprising:

software executable by a processor, the software being configured to format an image at a second zoom level to comprise a second set of overlapping image tiles, wherein each image tile within the second set of overlapping image tiles has the same size; and software executable by a processor, the software being configured to select a single image tile from the second set for viewing on a display.

10. The machine readable media of claim 8, wherein each image tile within the first set of overlapping image tiles overlaps an adjacent image tile by 50%.

11. The machine readable media of claim 9, wherein each image tile within the second set of overlapping image tiles overlaps an adjacent image tile by 50%.

12. The machine readable media of claim 8, wherein each block is formatted to be half of a tile width size.

13. The machine readable media according to claim 8, wherein the third module is configured to access an image tile by performing one seek at a beginning of the image tile and reading the whole image tile.

14. The machine readable media according to claim 8, wherein the third module is configured to stream image data to a display without substantial computer operating system intervention.

* * * * *